United States Patent
Ackerman et al.

(10) Patent No.: US 7,348,484 B1
(45) Date of Patent: Mar. 25, 2008

(54) METHOD OF ASSISTING A COMPROMISED BARRIER

(75) Inventors: Eva Ackerman, Houston, TX (US); Randy Gene Clark, Kingwood, TX (US)

(73) Assignee: The RectorSeal Corporation, Houston, TX (US)

( * ) Notice: Subject to any disclaimer, the term of this patent is extended or adjusted under 35 U.S.C. 154(b) by 429 days.

(21) Appl. No.: 09/764,572

(22) Filed: Jan. 18, 2001

(51) Int. Cl.
*H02G 3/08* (2006.01)

(52) U.S. Cl. ............... 174/50; 174/66; 220/241; 29/729; 52/232

(58) Field of Classification Search ............... 174/66, 174/50, 67; 220/3.2, 3.8, 241, 242, 378; 52/232; 29/729, 739, 525.1; 439/148, 271
See application file for complete search history.

(56) References Cited

U.S. PATENT DOCUMENTS

| | | | |
|---|---|---|---|
| 3,914,495 A | 10/1975 | Lania et al. ............... 428/255 |
| 3,965,629 A | 6/1976 | Pearson |
| 4,018,962 A | 4/1977 | Pedlow ............... 428/245 |
| 4,072,316 A | 2/1978 | Decker et al. |
| 4,087,624 A | 5/1978 | Hitchcock ............... 174/57 |
| 4,163,137 A * | 7/1979 | Close, Jr. ............... 200/302.3 |
| 4,270,318 A | 6/1981 | Carroll et al. |
| 4,293,173 A * | 10/1981 | Tricca ............... 439/148 |
| 4,432,465 A | 2/1984 | Wuertz |
| 4,447,484 A | 5/1984 | Slosberg et al. |
| 4,573,297 A | 3/1986 | Benscoter et al. |
| 4,616,104 A | 10/1986 | Lindsey ............... 174/48 |
| 4,663,226 A | 5/1987 | Vajs et al. ............... 428/305.5 |
| 4,667,840 A | 5/1987 | Lindsey ............... 220/3.2 |
| 4,733,330 A | 3/1988 | Tanaka et al. |
| 5,308,648 A | 5/1994 | Prince et al. ............... 427/212 |
| 5,556,578 A | 9/1996 | Berneburg et al. ............... 252/604 |

(Continued)

FOREIGN PATENT DOCUMENTS

EP 0 839 853 A1 5/1998

OTHER PUBLICATIONS

Pending U.S. Appl. No. 09/283,331 filed Mar. 31, 1999 entitled "Process for Producing Heat Expandable Compositions and Flexible Articles Containing the Same" by Eva Ackerman.

(Continued)

*Primary Examiner*—Dhiru R. Patel
(74) *Attorney, Agent, or Firm*—John Wilson Jones; Jones & Smith, LLP

(57) ABSTRACT

The present invention provides method, apparatus, and system to assist in partially or fully reestablishing the fire rating of a barrier that has been compromised by the installation of an electrical box(es) in the barrier. The electrical box includes a faceplate having a fire retardant material, such as an intumescent material, coupled to the faceplate and/or coupled between the box and the faceplate. The fire retardant material enhances the fire resistance of the compromised area of the barrier. In one embodiment, the fire retardant material can be in the form of a gasket that can be used cooperatively with the faceplate and the electrical box. In another embodiment, the fire retardant material can be established on one or more surfaces of the faceplate by molding, spraying, dipping, coating or any other methods of application of the material to a surface.

8 Claims, 1 Drawing Sheet

U.S. PATENT DOCUMENTS

| | | |
|---|---|---|
| 5,675,125 A | 10/1997 | Hollinger |
| 5,681,640 A | 10/1997 | Kiser |
| 5,773,760 A * | 6/1998 | Stark et al. .................. 174/66 |
| 5,830,319 A | 11/1998 | Landin ....................... 162/159 |
| 5,851,663 A | 12/1998 | Parsons et al. ............. 428/355 |
| 6,153,674 A * | 11/2000 | Landin ........................ 524/35 |
| 6,207,085 B1 | 3/2001 | Ackerman |
| 6,252,167 B1 * | 6/2001 | Rose ..................... 220/241 X |
| 6,265,662 B1 * | 7/2001 | Riedy et al. .................. 174/67 |
| 6,521,834 B1 * | 2/2003 | Dykhoff et al. ............... 174/66 |

OTHER PUBLICATIONS

Pending U.S. Appl. No. 09/283,349 filed Mar. 31, 1999 entitled "Heat Expandable Compositions" by Eva Ackerman.

\* cited by examiner

METHOD OF ASSISTING A COMPROMISED BARRIER

FIELD OF THE INVENTION

This invention relates to electrical boxes, such as outlet or junction boxes, and portions thereof that are used for commercial or residential buildings and industrial applications. Specifically, the invention relates to reestablishing a fire rating of a barrier when the rating has been compromised by the installation of an electrical box.

BACKGROUND OF THE INVENTION

Electrical boxes can include control panels, power outlets, mounting boxes, and other enclosed or partially enclosed spaces housing electrical components. The electrical box typically houses wires, switches, outlets, and other electrical components that are connected to other wires or electrical components. The National Fire Protection Association (NFPA) has established various guidelines, such as the NFPA-70 known as the National Electrical Code (NEC), and codified rules to help ensure the safety of installations of electrical boxes. For example, the construction of a wall, floor, ceiling, or other barrier results in a particular fire rating for a certain amount of time as measured by approved testing standards, codified by mandated building authorities. An electrical box mounted or otherwise introduced into the barrier can compromise the fire rating of that barrier due to altering the barrier's previously tested and established rating. Without additional protection, an electrical box cannot be placed closer to a box on the opposite side of the barrier within a pre-established distance. Otherwise, the fire rating of the barrier can be compromised below the required local codes.

Those in the industry have recognized the need to reestablish the fire rating of walls, floors, and other barriers when that rating has been compromised by the introduction of such electrical boxes. Typically, such efforts involve applying a material to an external surface of the box. Such external protection is generally not conducive to retrofitting a box that has been already installed in a barrier.

Therefore, there remains a need for an apparatus and method to assist in reestablishing the fire rating of a barrier that has been compromised with an electrical box.

SUMMARY OF THE INVENTION

The present invention provides method, apparatus, and system to assist in partially or fully reestablishing the fire rating of a barrier that has been compromised by the installation of an electrical box(es) in the barrier. The electrical box includes a faceplate having a fire retardant material, such as an intumescent material, coupled to the faceplate and/or coupled between the box and the faceplate. The fire retardant material enhances the fire resistance of the compromised area of the barrier. In one embodiment, the fire retardant material can be in the form of a gasket that can be used cooperatively with the faceplate and the electrical box. In another embodiment, the fire retardant material can be established on one or more surfaces of the faceplate by molding, spraying, dipping, coating or any other methods of application of the material to a surface.

In one embodiment, a method is provided for at least partially reestablishing a fire rating of a barrier that has been compromised with an electrical box introduced into the barrier, comprising: providing a fire retardant gasket, coupling the gasket between a faceplate and an electrical box adapted to be introduced into the barrier, and coupling the faceplate to the box. A gasket is also provided for at least partially reestablishing a fire rating of a barrier that has been compromised with an electrical box introduced into the barrier, comprising a fire retardant material formed into a gasket that is adapted to be placed between a faceplate and an electrical box before the faceplate is attached to the electrical box. Further, a system is provided for reestablishing a fire rating of a barrier, comprising a gasket formed of fire retardant material, and a faceplate adapted to be attached to an electrical box with the gasket coupled therebetween.

BRIEF DESCRIPTION OF THE DRAWINGS

A more particular description of the invention, briefly summarized above, may be had by reference to the embodiments thereof which are illustrated in the appended drawings and described herein. It is to be noted, however, that the appended drawings illustrate only some embodiments of the invention and are therefore not to be considered limiting of its scope, because the invention may admit to other equally effective embodiments.

DETAILED DESCRIPTION OF A PREFERRED EMBODIMENT

Figure 1:
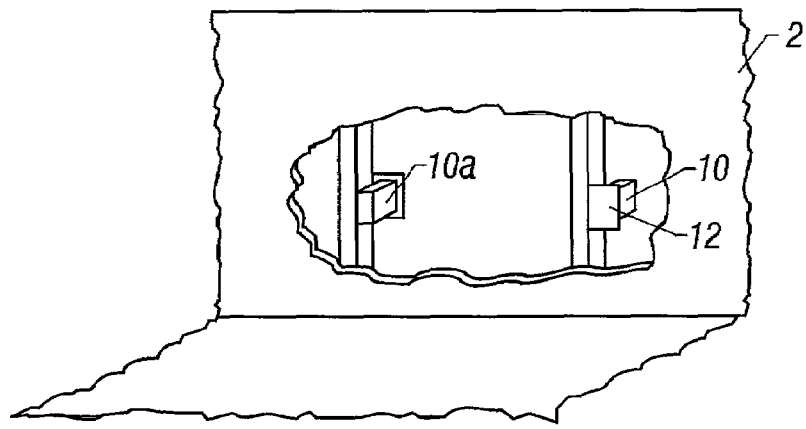
FIG. 1 is a perspective schematic view of a barrier having an electrical box mounted therein.

FIG. 1 is a perspective schematic view of electrical boxes installed on opposite sides within a fire-rated barrier. A wall, ceiling, floor or other structure, herein a "barrier" 2, can be constructed to resist the transfer of fire or of elevated temperatures therethrough and has a fire rating. Generally, an electrical box 10 is installed in the barrier 2 for electrical outlets, wiring, and other related purposes. However, the electrical box 10 can compromise the fire resistance of the barrier 2 due to its location within the construction. If the box is mounted too close to an adjacent box 10a, the fire rating can be compromised below acceptable standards without the use of additional protection.

A faceplate 12 generally covers the electrical box 10 to comply with Code, security, and/or for safety reasons. The faceplate 12 may be a "blind" plate, that is, having no openings, other than perhaps openings for screws or other fasteners to attach the faceplate 12 to the box 10. Alternatively, the faceplate 12 may have openings (not shown) for accessing electrical components contained in the box 10, such as an outlet plug or switches (not shown). Some faceplates can be hingeably attached to the electrical box.

Figure 2:
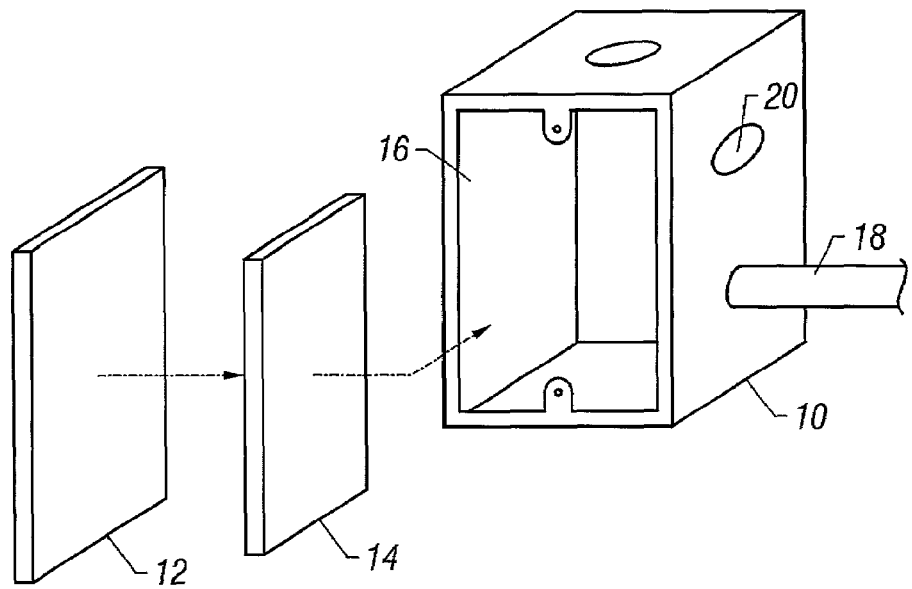
FIG. 2 is a perspective schematic view of the electrical box with a faceplate and fire retardant gasket.
Figure 3:
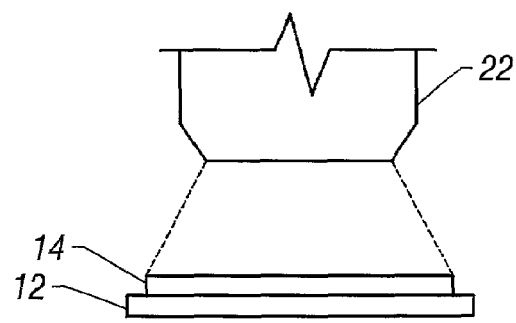
FIG. 3 is a schematic side view of an exemplary embodiment of the faceplate with the fire retardant gasket.

The present invention includes a fire retardant material, such as an intumescent material, shown in FIGS. 2 and 3, coupled to the faceplate 12 and/or electrical box 10. The fire retardant material enhances the fire resistance of the area of the barrier compromised by electrical box 10 installation and, thus, can assist in fully or partially reestablishing (herein "at least partially reestablishing") the fire rating of the barrier.

FIG. 2 is a perspective schematic view of an electrical box with a faceplate. The electrical box 10 can be rectangular, square, octagonal, round, or any other geometric shape. Generally, the electrical box 10 includes at least one face 16 that is open for manipulation of wires, connection of joints between wires, and other operations related to the electrical box. The electrical box 10 also can include at least one opening 20 for insertion of wires or components through a perimeter surface of the box. Various electrical conduits 18 containing wires can be coupled to the electrical box, such as at the opening 20, and are known to those with ordinary skill in the art. The box 10 is made of typical metallic or non-metallic materials.

The face 16 is generally covered by a faceplate 12 after various operations that are performed within the box 10 are completed. The faceplate 12 generally has a shape that corresponds to the electrical box. The faceplate 12 can likewise be made of metallic or non-metallic materials.

In one embodiment, a fire retardant, preferably an intumescent, gasket 14 is used in conjunction with the faceplate 12 and the electrical box 10. Intumescent materials are known to those with ordinary skill in the art and include materials engineered to expand when exposed to heat to a certain design criteria. Without limitation and merely as examples, intumescent materials include Metacaulk® Wrap Strip™ and BlazeSeal™, both available from Rectorseal Corporation. Other fire retardant materials include, without limitation and merely by way of further example, fire resistant insulative material such as mineral wool, ceramic fibers, and intumescent graphite. Further, it is to be understood that the use of the fire retardant material, spacing of the electrical boxes, and construction of the barrier should comply with any NFPA, Underwriters Laboratories (UL), American Society for Testing and Materials (ASTM), NEC, or other adopted or recognized regulatory standards and codes. In one embodiment, the fire retardant material can be extruded, rolled, molded, or otherwise shaped to form the fire retardant gasket 14 as a generally planar object. Further, the gasket 14 can be formed with one or more openings (not shown) to accommodate corresponding openings in the faceplate and/or box.

The gasket 14 assists in at least partially reestablishing the fire rating of a barrier that has been compromised with the box 10. The gasket 14 can be coupled to the faceplate and/or box in some manner, such as affixing the gasket to the faceplate and/or the face of the box by use of various adhesives, attachments, fasteners, or other methods that secure the gasket in position. Generally, the gasket 14 is secured between the faceplate 12 and the box 10. Further, the gasket 14 can be placed between the faceplate and the electrical box as the faceplate is attached to the box.

The gasket 14 can be used for new installations of electrical boxes. Similarly, existing installations of electrical boxes can be retrofitted with the gasket 14 in situ, that is, without removing the box 10 from the barrier 2 on which the box is installed and/or without removing electrical components installed in the box.

FIG. 3 is a schematic side view of an exemplary embodiment of the faceplate 12 with the fire retardant material applied thereto. The gasket 14 can be formed on the faceplate 12. For example, the fire retardant material can be sprayed, molded, dipped, or otherwise established on one or more surfaces of the faceplate 12 to create the gasket 14. A dispenser 22 can be used to dispense the fire retardant material to desired surface(s) to establish the gasket. The thickness of the gasket can vary depending on the particular material, temperature, viscosity, time, and size of nozzle ports, and other factors.

While the foregoing is directed to various embodiments of the present invention, other and further embodiments may be devised without departing from the basic scope thereof. For example, various methods can be included in combination with each other to produce other variations of the disclosed embodiments. Orientations of barriers, boxes, faceplates, gaskets, tooling, or other features that are shown and/or described herein are representative and are not to be construed as limiting. Further, any headings herein are for the convenience of the reader and are not intended to limit the scope of the invention.

We claim:

1. A method of assisting a compromised barrier, comprising:
   a) providing a gasket comprising fire retardant material of a fire resistant insulative material containing mineral wool or intumescent graphite;
   b) placing the fire retardant gasket between a faceplate and an electrical box adapted to be introduced into the barrier;
   c) coupling the faceplate to the box; and
   d) at least partially reestablishing a fire rating of the barrier.

2. The method of claim 1, further comprising coupling the gasket in situ between the faceplate and the box.

3. The method of claim 1, wherein providing the gasket comprises forming the gasket as a separate element prior to placing the gasket between the faceplate and the box.

4. The method of claim 1, further comprising forming the gasket on one or more surfaces of the faceplate prior to coupling the faceplate to the box.

5. The method of claim 4, wherein the gasket is formed by establishing a coating of the fire retardant material onto the faceplate.

6. A method of assisting a compromised barrier, comprising:
   a) installing into a fire-rated barrier an electrical box, the electrical box compromising the fire resistance of the fire-rated barrier;
   b) introducing into the electrical box a fire retardant gasket of a fire resistant insulative material containing mineral wool or intumescent graphite; and
   c) covering the electrical box with a faceplate.

7. The method of claim 6, wherein the fire retardant gasket is adhered to the faceplate prior to covering the electrical box with the faceplate.

8. The method of claim 6, wherein the fire retardant gasket is introduced to the electrical box without removing the electrical box from the fire resistant barrier.

* * * * *